(12) United States Patent
Chen et al.

(10) Patent No.: US 11,334,083 B2
(45) Date of Patent: May 17, 2022

(54) ROUTE TRACKING METHOD FOR MOBILE VEHICLE

(71) Applicant: ZHEJIANG YAT ELECTRICAL APPLIANCE CO., LTD, Zhejiang (CN)

(72) Inventors: Yong Chen, Zhejiang (CN); Jianfei Gong, Zhejiang (CN); Fengwu Chen, Zhejiang (CN); Zhe Zhang, Zhejiang (CN)

(73) Assignee: ZHEJIANG YAT ELECTRICAL APPLIANCE CO., LTD, Zhejiang (CN)

( * ) Notice: Subject to any disclaimer, the term of this patent is extended or adjusted under 35 U.S.C. 154(b) by 208 days.

(21) Appl. No.: 16/647,506

(22) PCT Filed: May 30, 2019

(86) PCT No.: PCT/CN2019/089202
§ 371 (c)(1),
(2) Date: Mar. 15, 2020

(87) PCT Pub. No.: WO2019/228435
PCT Pub. Date: Dec. 5, 2019

(65) Prior Publication Data
US 2020/0218273 A1 Jul. 9, 2020

(30) Foreign Application Priority Data

Jun. 1, 2018 (CN) .......................... 201810556921.4

(51) Int. Cl.
G05D 1/02 (2020.01)
B60W 60/00 (2020.01)
B60W 50/00 (2006.01)

(52) U.S. Cl.
CPC ........... *G05D 1/0221* (2013.01); *B60W 50/00* (2013.01); *B60W 60/001* (2020.02);
(Continued)

(58) Field of Classification Search
CPC ............... G05D 1/0221; G05D 1/0223; G05D 2201/0208; B60W 60/001; B60W 50/00; B60W 2050/0031; B60W 2520/28
See application file for complete search history.

(56) References Cited

U.S. PATENT DOCUMENTS 8,494,726 B2 7/2013 Peake et al.
2017/0010618 A1* 1/2017 Shashua ............... G05D 1/0221

FOREIGN PATENT DOCUMENTS

CN 101866181 A 10/2010
CN 101885350 B 2/2012
(Continued)

OTHER PUBLICATIONS

International Search Report for PCT/CN2019/089202 dated Aug. 30, 2019, ISA/CN.

*Primary Examiner* — Russell Frejd
*Assistant Examiner* — Anthony M Gartrelle
(74) *Attorney, Agent, or Firm* — Yue (Robert) Xu; Apex Attorneys at Law, LLP

(57) ABSTRACT

A path tracking method is provided. The path tracking method includes obtaining a current location and a current traveling direction of the mobile vehicle, and determining a traveling path along which the mobile vehicle travels to a destination based on the current location and the current traveling direction; simplifying the mobile vehicle into a differential model, establishing a forward objective function of the differential model in the traveling path, and obtaining an optimal solution of the forward objective function; and controlling a speed of the mobile vehicle corresponding to
(Continued)

the differential model by using the optimal solution as an optimal differential control variable, until the mobile vehicle reaches the destination. The path tracking method is simple in calculation, adopts algorithms that is naturally stable, and is used in combination with integrated navigation, thereby ensuring stability and reliability of tracking.

3 Claims, 2 Drawing Sheets

(52) U.S. Cl.
CPC ... *G05D 1/0223* (2013.01); *B60W 2050/0031* (2013.01); *B60W 2520/28* (2013.01); *G05D 2201/0208* (2013.01)

(56) References Cited

FOREIGN PATENT DOCUMENTS

| | | |
|---|---|---|
| CN | 102854878 A | 1/2013 |
| CN | 108646743 A | 10/2018 |
| JP | 2015199370 A | 11/2015 |

\* cited by examiner

ROUTE TRACKING METHOD FOR MOBILE VEHICLE

The present application claims priority to Chinese Patent Application No. 201810556921.4, titled "ROUTE TRACKING METHOD FOR MOBILE VEHICLE", filed on Jun. 1, 2018 with the China National Intellectual Property Administration, which is incorporated herein by reference in its entirety.

FIELD

The present disclosure relates to the field of navigation, and particularly relates to a path tracking method for a mobile vehicle.

BACKGROUND

During the movement of various mobile vehicles, such as a smart lawnmower, an original planned path may not be followed due to terrain fluctuations or errors of moving components. Therefore, how to track traveling paths of mobile vehicles becomes an urgent problem to be solved.

SUMMARY

To overcome the disadvantages in the conventional technology, a path tracking method for a mobile vehicle is provided according to embodiments of the present disclosure, to improve accuracy of a traveling path of the mobile vehicle.

To achieve the above objective, a path tracking method for a mobile vehicle is provided according to embodiments of the present disclosure. The path tracking method includes:

obtaining a current location and a current traveling direction of the mobile vehicle, and determining a traveling path along which the mobile vehicle travels to a destination based on the current location and the current traveling direction;

simplifying the mobile vehicle into a differential model, establishing a forward objective function of the differential model in the traveling path, and obtaining an optimal solution of the forward objective function; and controlling a speed of the mobile vehicle corresponding to the differential model by using the optimal solution as an optimal differential control variable, until the mobile vehicle reaches the destination.

Optionally, the simplifying the mobile vehicle into a differential model may include:

obtaining a speed value of a driving wheel of the mobile vehicle;

calculating a location and a traveling direction of the mobile vehicle at a next time instant based on the current location, the current traveling direction and the speed value of the driving wheel; and calculating a lateral deviation and a traveling direction deviation of the mobile vehicle at the next time instant based on the current location and the location of the mobile vehicle at the next time instant.

Optionally, the establishing a forward objective function of the differential model in the traveling path, and obtaining an optimal solution of the forward objective function may include:

defining an objective function of:

$$h_m = (k \cdot p_{em})^2 + (\theta_{em})^2,$$

where k is a weighting coefficient;

calculating a value of $h_m$ corresponding to m, where m=1,2, ... n, and obtaining $m_{min}$, which is a value of m corresponding to a minimum value of $h_m$; and obtaining $\delta v = \delta v_{m_{min}}$ as the optimal solution of the forward objective function.

Optionally, controlling the mobile vehicle corresponding to the differential model by using the optimal solution as an optimal differential control variable may include:

calculating a rotational speed of a driving wheel of the mobile vehicle based on the obtained optimal differential control variable according to following kinematic model, to control traveling and steering of the mobile vehicle:

$$v_{lk} = v - \delta v/2, \text{ and}$$

$$v_{rk} = v + \delta v/2,$$

where a rotational speed of a left driving wheel $\omega_l$ and a rotational speed of a right driving wheel $\omega_r$ are obtained respectively according to equation of:

$$\omega_l = v_l * k_{redu} / \pi / D, \text{ and}$$

$$\omega_r = v_r * k_{redu} / \pi / D,$$

where $k_{redu}$ is a motor deceleration ratio, and D is a diameter of the wheel.

The following beneficial effect can be achieved with the technical solutions of the present disclosure.

By simplifying the kinematic model of the mobile vehicle into a two-wheel differential model, an optimal path tracking is obtained. The automatic operation of the lawnmower is performed by means of minimum mean square error. The path tracking method according to the present disclosure is simple in calculation, adopts algorithms that is naturally stable, and is used in combination with integrated navigation, thereby ensuring stability and reliability of tracking.

BRIEF DESCRIPTION OF THE DRAWINGS

For clearer illustration of the technical solutions according to embodiments of the present disclosure, the drawings involved in description of the embodiments according to the present disclosure are briefly described hereinafter. Apparently, the drawings in the following descriptions only illustrate some embodiments of the present disclosure, and other drawings may be obtained by those skilled in the art based on the drawings without any inventive efforts.

DETAILED DESCRIPTION

To make the technical solutions and advantages of the present application clearer, the technical solutions according to the embodiments of the present application will be described clearly and completely as follows in conjunction with the drawings in the embodiments of the present application.

First Embodiment

Figure 1:
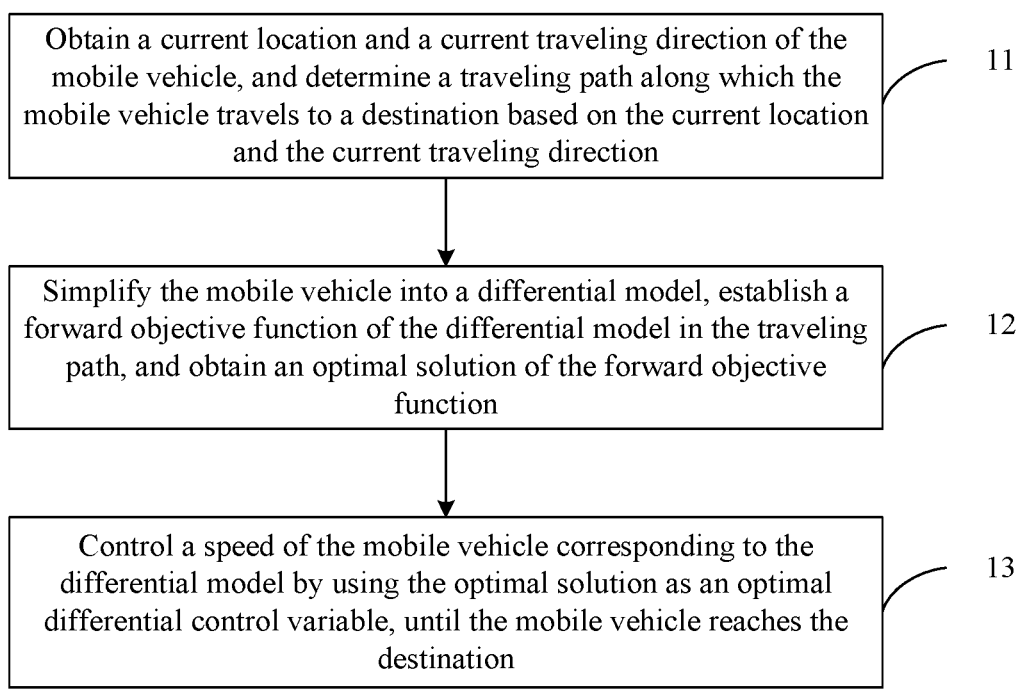
FIG. 1 is a flow chart of a path tracking method for a mobile vehicle according to an embodiment of the present disclosure.

A path tracking method for a mobile vehicle is provided according to the present disclosure. Referring to FIG. 1, the path tracking method includes the following steps 11 to 13.

In step 11, a current location and a current traveling direction of the mobile vehicle are obtained, and a traveling path along which the mobile vehicle travels to a destination is determined based on the current location and the current traveling direction.

In step 12, the mobile vehicle is simplified into a differential model, a forward objective function of the differential model in the traveling path is established, and an optimal solution of the forward objective function is obtained.

In step 13, a speed of the mobile vehicle corresponding to the differential model is controlled by using the optimal solution as an optimal differential control variable, until the mobile vehicle reaches the destination.

In this embodiment, the traveling path of the mobile vehicle is tracked accurately, and an actual traveling path of the mobile vehicle is modified in a real-time manner based on the tracking results, such that accuracy of the path tracking is improved.

In a first step, a current location and a current traveling direction of a lawnmower are updated in a real-time manner by using integrated navigation, and a target path to be tracked is obtained by means of a path planning method. If the target path is a linear segment, a straight line determined by the two ends of the linear segment is directly taken as the target path. If the target path is a curve segment, the curve segment is subdivided into multiple linear segments according to requirements, to form a polyline segment including the multiple linear segments, and the multiple linear segments are tracked in sequence.

In a second step, a kinematic model of the mobile vehicle is simplified into a two-wheel differential model, thus, traveling and steering of the mobile vehicle are controlled by utilizing a speed difference between two wheels of the lawnmower. The speed difference $\delta v$ between two wheels is used as a control variable. An n-dimensional control variable sequence $[\delta v_1\ \delta v_2\ \ldots\ \delta v_{n-1}\ \delta v_n]$ is selected from a range of control variables $[\delta v_{min}\ \delta v_{max}]$. A location and a traveling direction of the mobile vehicle at a next time instant corresponding to the control variable are calculated by using the kinematic models. A lateral deviation $p_e$ and a traveling direction deviation $\theta_e$ corresponding to the control variable are calculated, to obtain a control variable $\delta v$ corresponding to a minimum weighted mean square error of $p_e$ and $\theta_e$ among all sequences, and the control variable $\delta v$ is used as the required optimal control variable.

In a third step, based on the speed difference between two wheels and the forward traveling speed of the mobile vehicle obtained in the second step, rotary speeds of motors of a left wheel and a right wheel are separately obtained, and a control command is sent to a motor driver to control the traveling of the mobile vehicle.

In practice, a GNSS/INS/vehicle integrated navigation may be used to provide precise location and traveling direction information for the lawnmower. The kinematic model of the lawnmower is simplified into a two-wheel differential model for optimal path tracking. The minimum mean square error (MMSE) is used to obtain the optimal differential control variable of the mobile vehicle based on the location deviation from a target path and the traveling direction deviation from a target traveling direction. Based on the obtained control variable, a control command is provided to an actuator of the mobile vehicle, that is, motors of the two wheels, such that the planed path of the lawnmower is followed accurately, and automatic operation of the lawnmower is realized. The path tracking method according to the present disclosure is simple in calculation, uses algorithms that are naturally stable, and is combined with integrated navigation, thereby ensuring stability and reliability of path tracking.

Optionally, the mobile vehicle is simplified into a two-wheel differential model to facilitate subsequent steps. The step of simplifying the mobile vehicle into the two-wheel differential model includes:

obtaining a speed value of a driving wheel of the mobile vehicle;

calculating a location and a traveling direction of the mobile vehicle at a next time instant based on the current location, the current traveling direction and the speed value of the driving wheel of the mobile vehicle; and calculating a lateral deviation and a traveling direction deviation of the mobile vehicle at the next time instant based on the current location and the location of the mobile vehicle at the next time instant.

A conventional two-wheel drive smart lawnmower is used as an example to illustrate obtaining of the control variable.

Figure 2:
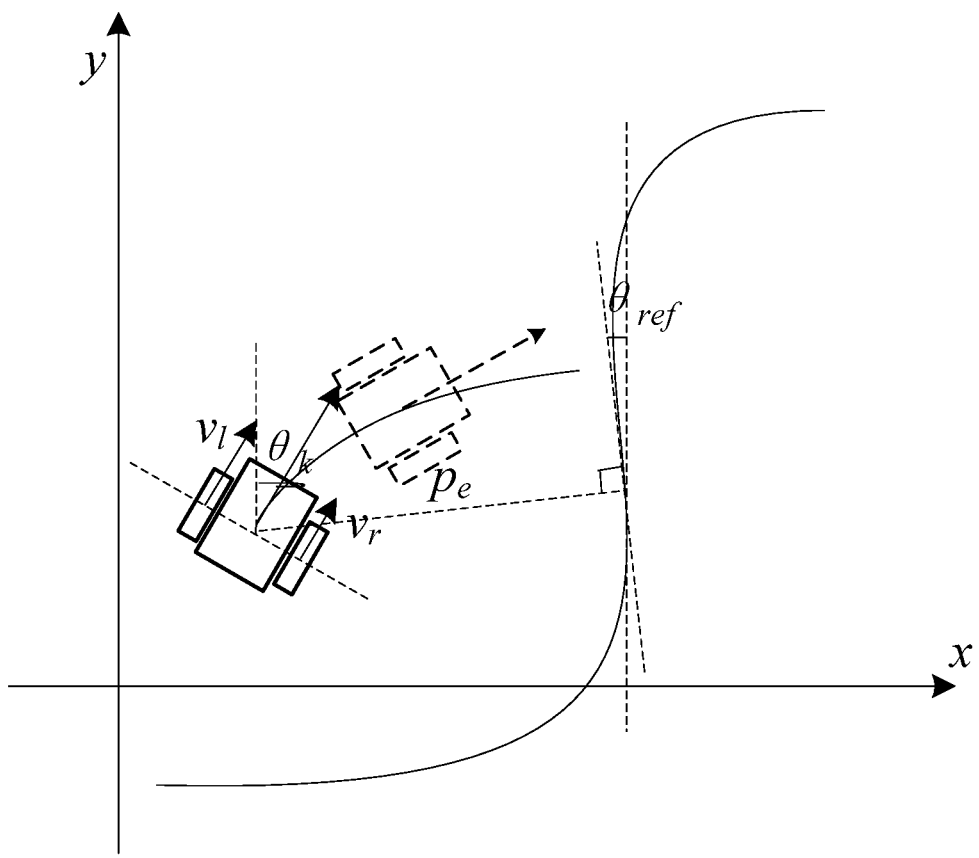
FIG. 2 is a schematic diagram illustrating a process of adjusting a traveling path of a mobile vehicle according to an embodiment of the present disclosure.

An actuator of the lawnmower is two driving wheels, and traveling and steering of the lawnmower are realized through a speed difference between the two driving wheels. A kinematic model of the lawnmower is simplified into a two-wheel differential model, which is shown in FIG. 2. The speed difference $\delta v$ between the two driving wheels is used as a control variable. It is assumed that $\delta v$ is within a range of $[\delta v_{min}\ \delta v_{max}]$. An n-dimensional sequence $[v_1\ \delta v_2\ \ldots\ \delta v_{n-1}\ \delta v_n]$ of the speed difference $\delta v$ is selected from the above range based on requirements. If a higher control accuracy is required, a sequence of a greater number of dimensions is to be selected.

It is assumed that, a speed of the vehicle is $v_k$ at a current time instant $t_k$, and linear speeds of a left wheel and a right wheel are $v_{lk}$ and $v_{rk}$ respectively, which follow the following equations:

$$v_k=(v_{lk}+v_{rk})/2,\text{ and}$$

$$\delta v=v_{rk}-v_{lk}.$$

It is assumed that a current location and a current traveling direction of the vehicle is $(x_k, y_k, \theta_k)$, and a location and a traveling direction of the vehicle at a next time instant $t_{k+1}$ corresponding to $\delta v$ obtained base on the kinematic model is $(x_{k+1}, y_{k+1}, \theta_{k+1})$, which may be expressed by:

$$\theta_{k+1}=\theta_k-\tan^{-1}(\delta v \cdot \delta t/L),$$

$$x_{k+1}=x_k+v_k \cdot \delta t \cdot \sin(\theta_{k+1}),\text{ and}$$

$$y_{k+1}=y_k+v_k \cdot \delta t \cdot \cos(\theta_{k+1}).$$

where $\delta t=t_{k+1}-t_k$ is a time interval, and L is a wheelbase length between wheels.

For any $\delta v_m (m=1,2, \ldots n)$, $p_{em}$ and $\theta_{em}$ at the time instant $t_{k+1}$ are calculated, and the lateral deviation $p_e$ is a perpendicular distance from a current location of the vehicle to a target path, which may be calculated according to an equation of:

$$p_e=\sqrt{(x_{k+1}-x_0)^2+(y_{k+1}-y_0)^2},$$

where $(x_0, y_0)$ represent the foot of the perpendicular line from the point $(x_{k+1}, y_{k+1})$ to the target path.

The traveling direction deviation $\theta_e$ is a difference between the current traveling direction and a target traveling direction, which may be calculated according to an equation of:

$$\theta_e=\theta_{k+1}-\theta_{ref},$$

where $\theta_{ref}$ represents the traveling direction of the target path shown in FIG. 2.

The objective function is defined as:

$$h_m = (k \cdot p_{em})^2 + (\theta_{em})^2,$$

where k represents a weighting coefficient, and the objective function may expressed as:

$$h_m = k^2[(x_{k+1}-x_0)^2 + (y_{k+1}-y_0)^2] + (\theta_{k+1}-\theta_{ref})^2$$

The objective function is used to calculate a deviation value between the current location of the mobile vehicle and the destination. A value of $h_m$ corresponding to m is calculated, where m=1,2, . . . n, $m_{min}$ is obtained, which is a value of m corresponding a minimum value of $h_m$, and $\delta v = \delta v_{m_{min}}$ is obtained as the optimal control variable.

By utilizing the objective function and obtaining its optimal solution, the traveling path of the mobile vehicle may be adjusted.

Optionally, controlling the mobile vehicle corresponding to the differential model by using the optimal solution as an optimal differential control variable includes:

calculating a rotational speed of a driving wheel of the mobile vehicle based on the optimal differential control variable according to the following kinematic model, to control traveling and steering of the mobile vehicle:

$$v_l = v - \delta v/2, \text{ and}$$

$$v_r = v + \delta v/2,$$

where v is a traveling liner speed of the vehicle, a rotational speed of a left driving wheel $\omega_l$ and a rotational speed of a right driving wheel $\omega_r$ are obtained respectively according to equations of:

$$\omega_l = v_l * k_{redu}/\pi/D, \text{ and}$$

$$\omega_r = v_r * k_{redu}/\pi/D,$$

where $k_{redu}$ is a motor deceleration ratio, and D is a diameter of the wheel.

In this embodiment, based on the δv obtained in the previous step, actual linear speeds of the left wheel and the right wheel in the two-wheel differential model are determined by increasing and decreasing the speed respectively through the kinematic model, and the actual linear speeds are converted into actual rotational speed $\omega_l$ and $\omega_r$ of the driving motors, to control the mobile vehicle.

The path tracking method for a mobile vehicle is provided according to the present disclosure. The current location and the current traveling direction of the mobile vehicle are obtained, and the traveling path along which the mobile vehicle travels to the destination is determined based on the current location and the current traveling direction. The mobile vehicle is simplified into the two-wheel differential model, the forward objective function of the differential model in the traveling path is established, and the optimal solution of the forward objective function is obtained. The obtained optimal solution is used as the optimal differential control variable to control the speed of the mobile vehicle corresponding to the differential model, until the mobile vehicle reaches the destination. By simplifying the kinematic model of the mobile vehicle into the two-wheel differential model, an optimal path tracking is obtained. The automatic operation of the mobile vehicle is performed by means of minimum mean square error. The path tracking method according to the present disclosure is simple in calculation, adopts algorithms that is naturally stable, furthermore, and is used in combination with integrated navigation, thereby ensuring stability and reliability of tracking.

Serial numbers used in the above embodiment are merely for illustration, and should not be understood as the order of assembling or using components.

The above embodiments are preferred embodiments of the present disclosure and are not intended to limit the scope of the present disclosure. Any alternations, modifications or equivalent substitutions made without departing from the spirit and scope of the technical solutions of the present disclosure fall within the protection scope of the present disclosure.

The invention claimed is:

1. A path tracking method for a mobile vehicle, comprising:

obtaining a current location and a current traveling direction of the mobile vehicle, and determining a traveling path along which the mobile vehicle travels to a destination based on the current location and the current traveling direction;

simplifying the mobile vehicle into a differential model, establishing a forward objective function of the differential model in the traveling path, and obtaining an optimal solution of the forward objective function;

controlling a speed of the mobile vehicle corresponding to the differential model by using the optimal solution as an optimal differential control variable, until the mobile vehicle reaches the destination;

wherein the establishing a forward objective function of the differential model in the traveling path, and obtaining an optimal solution of the forward objective function comprises:

defining an objective function of:

$$h_m = (k \cdot p_{em})^2 + (\theta_{em})^2,$$

wherein k is a weighting coefficient;

calculating a value of $h_m$ corresponding to m, where m=1,2, . . . n, and obtaining $m_{min}$, which is a value of m corresponding a minimum value of $h_m$; and obtaining $\delta v = \delta v_{m_{min}}$ as the optimal solution of the forward objective function.

2. The path tracking method for a mobile vehicle according to claim 1, wherein the simplifying the mobile vehicle into a differential model comprises:

obtaining a speed value of a driving wheel of the mobile vehicle;

calculating a location and a traveling direction of the mobile vehicle at a next time instant based on the current location, the current traveling direction and the speed value of the driving wheel; and calculating a lateral deviation and a traveling direction deviation of the mobile vehicle at the next time instant based on the current location and the location of the mobile vehicle at the next time instant.

3. The path tracking method for a mobile vehicle according to claim 1, wherein controlling the mobile vehicle corresponding to the differential model by using the optimal solution as an optimal differential control variable comprises:

calculating a rotational speed of a driving wheel of the mobile vehicle based on the obtained optimal differential control variable according to following kinematic model, to control traveling and steering of the mobile vehicle:

$$v_{lk} = v - \delta v/2, \text{ and}$$

$$v_{rk} = v + \delta v/2,$$

wherein a rotational speed of a left driving wheel $\omega_l$ and a rotational speed of a right driving wheel $\omega_r$ are obtained respectively according to equation of:

$\omega_l = v_l * k_{redu} / \pi D$, and $\omega_r = v_r * k_{redu} / \pi D$, wherein $k_{redu}$ is a motor deceleration ratio, and D is a diameter of the wheel.

* * * * *